July 21, 1953  E. ACKERMAN ET AL  2,646,027
AFTERCOOLER CONSTRUCTION

Filed Feb. 28, 1951  4 Sheets-Sheet 3

INVENTORS
EDWARD ACKERMAN
ANGELO DeFEO
WILLIAM H. FRANCISCO, JR.

BY *Victor D. Behn*

ATTORNEY

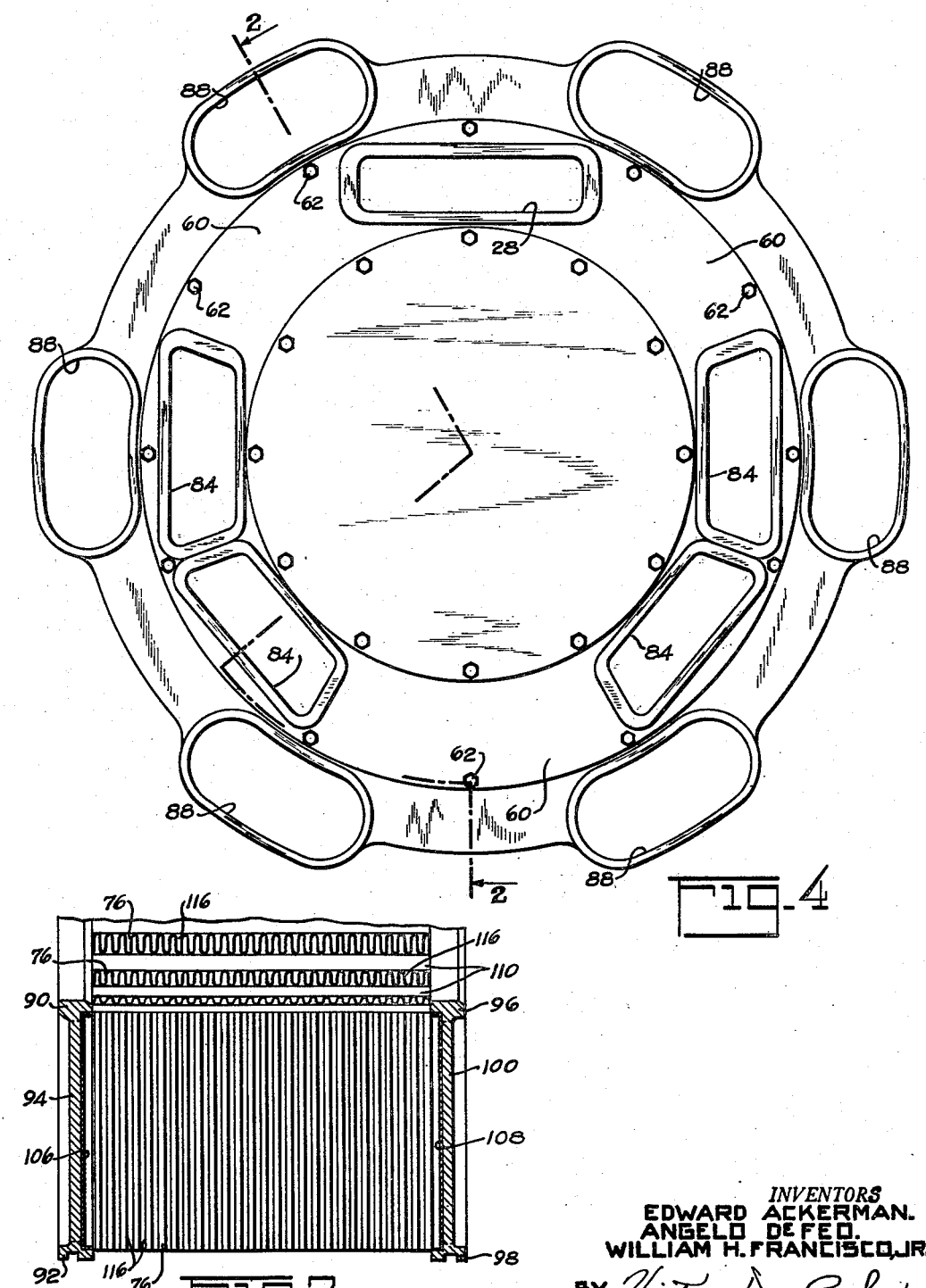

Patented July 21, 1953

2,646,027

UNITED STATES PATENT OFFICE 2,646,027

AFTERCOOLER CONSTRUCTION

Edward Ackerman, Hawthorne, Angelo De Feo, Paterson, and William H. Francisco, Jr., Bloomfield, N. J., assignors to Curtiss-Wright Corporation, a corporation of Delaware Application February 28, 1951, Serial No. 213,076

10 Claims. (Cl. 123—119)

This invention relates to heat exchange structures and to internal combustion engines having a supercharger for the engine intake air and is particularly directed to means for cooling the supercharged air prior to introduction of said air into the engine cylinders.

Internal combustion engines for aircraft are generally provided with a supercharger for compressing the engine intake air. This compression of the engine intake air results in a corresponding increase in the temperature of the air. Obviously any increase in the temperature of the engine intake air is objectionable because said temperature increase results in a corresponding decrease in the density of the engine intake air thereby decreasing the quantity of air entering each engine cylinder per intake stroke. Furthermore any increase in the temperature of the engine intake air decreases the range of detonation-free power available from the engine. For these reasons it is well known to provide apparatus for cooling the engine intake air after said air has been compressed and prior to its entry into the engine cylinders. Such apparatus is generally termed an "aftercooler."

An object of the present invention comprises the provision of a novel aftercooler heat exchange structure and a compact and efficient arrangement of such a structure with a supercharged internal combustion engine, such structure utilizing relatively cool air from the surrounding atmosphere for cooling the engine intake air.

Other objects of the invention will become apparent upon reading the annexed detailed description in connection with the drawing in which:

Fig. 4 is a diagrammatic end view taken along line 4—4 of Fig. 2;

Figure 3:
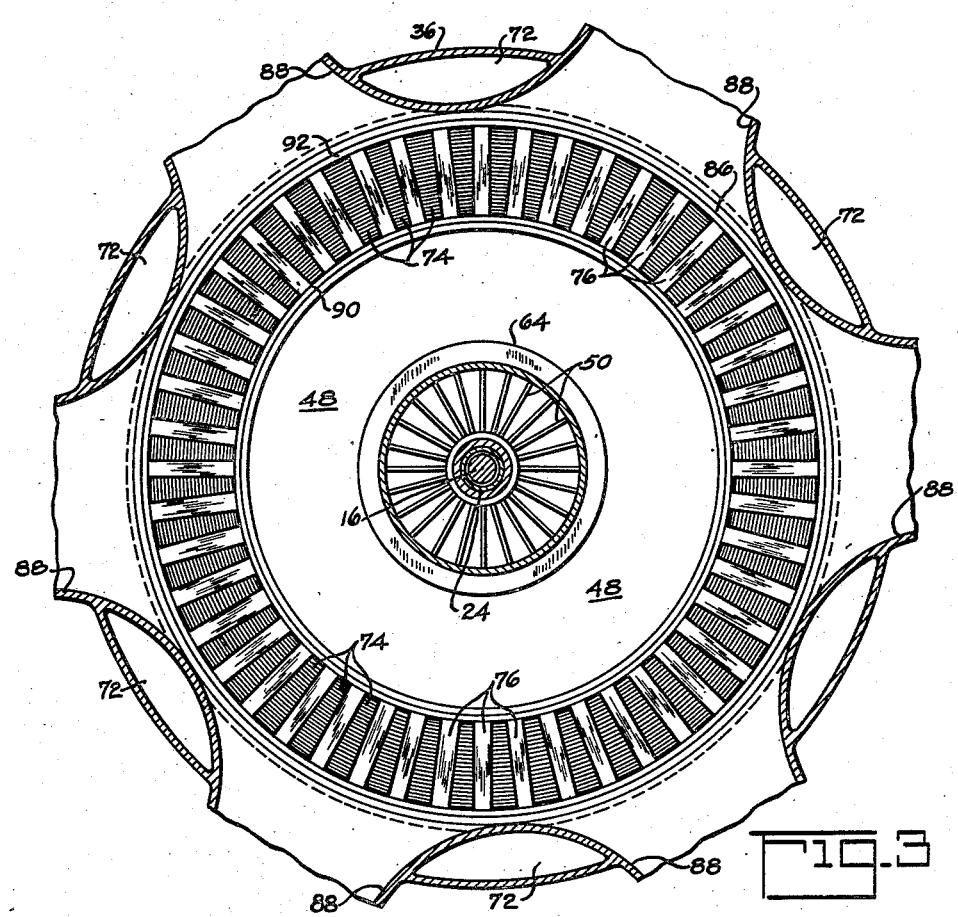
Fig. 3 is a sectional view taken along line 3—3 of Fig. 2.
Figure 5:
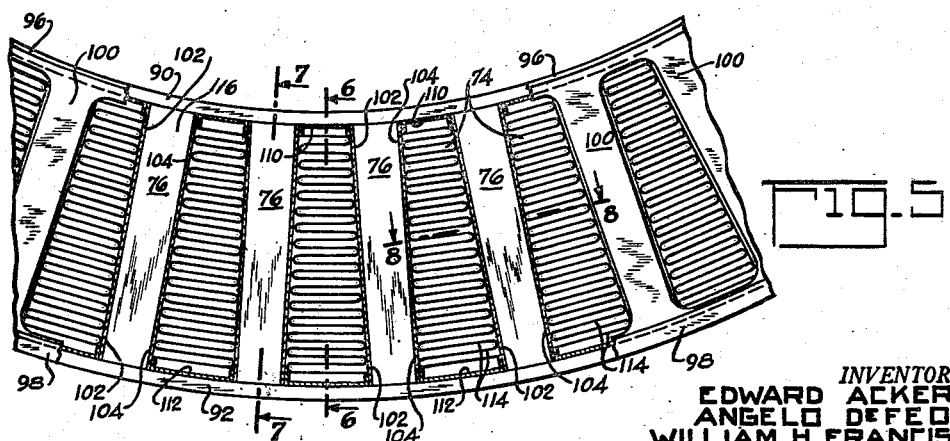

Fig. 5 is an enlarged view of a portion of Fig. 3 and illustrating a portion of the heat exchange structure in elevation; and Figs. 6, 7 and 8 are sectional views taken along lines 6—6, 7—7 and 8—8 respectively of Fig. 5.

Figure 1:
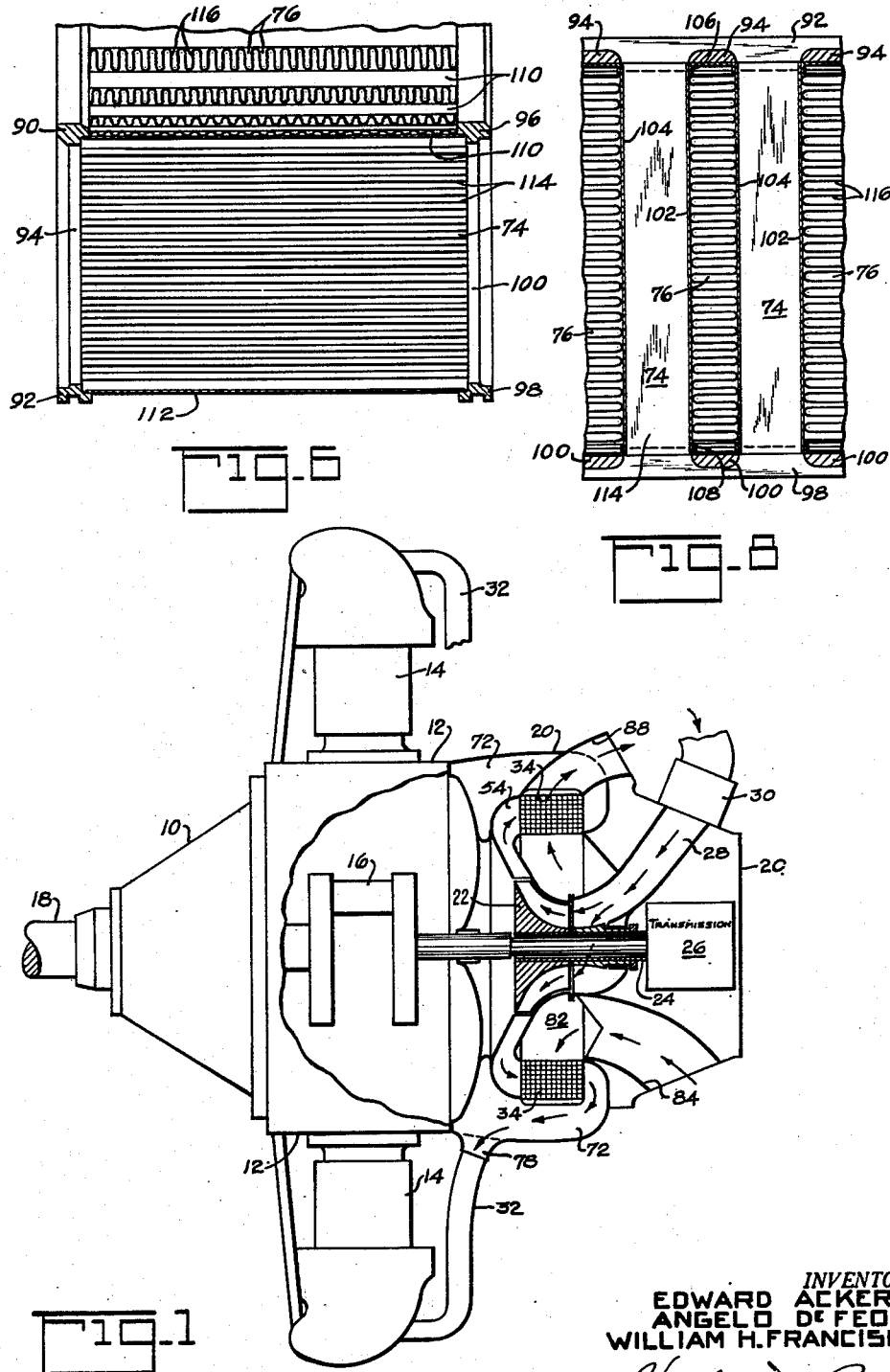
Fig. 1 is a diagrammatic view illustrating an internal combustion engine embodying the invention.
Figure 2:
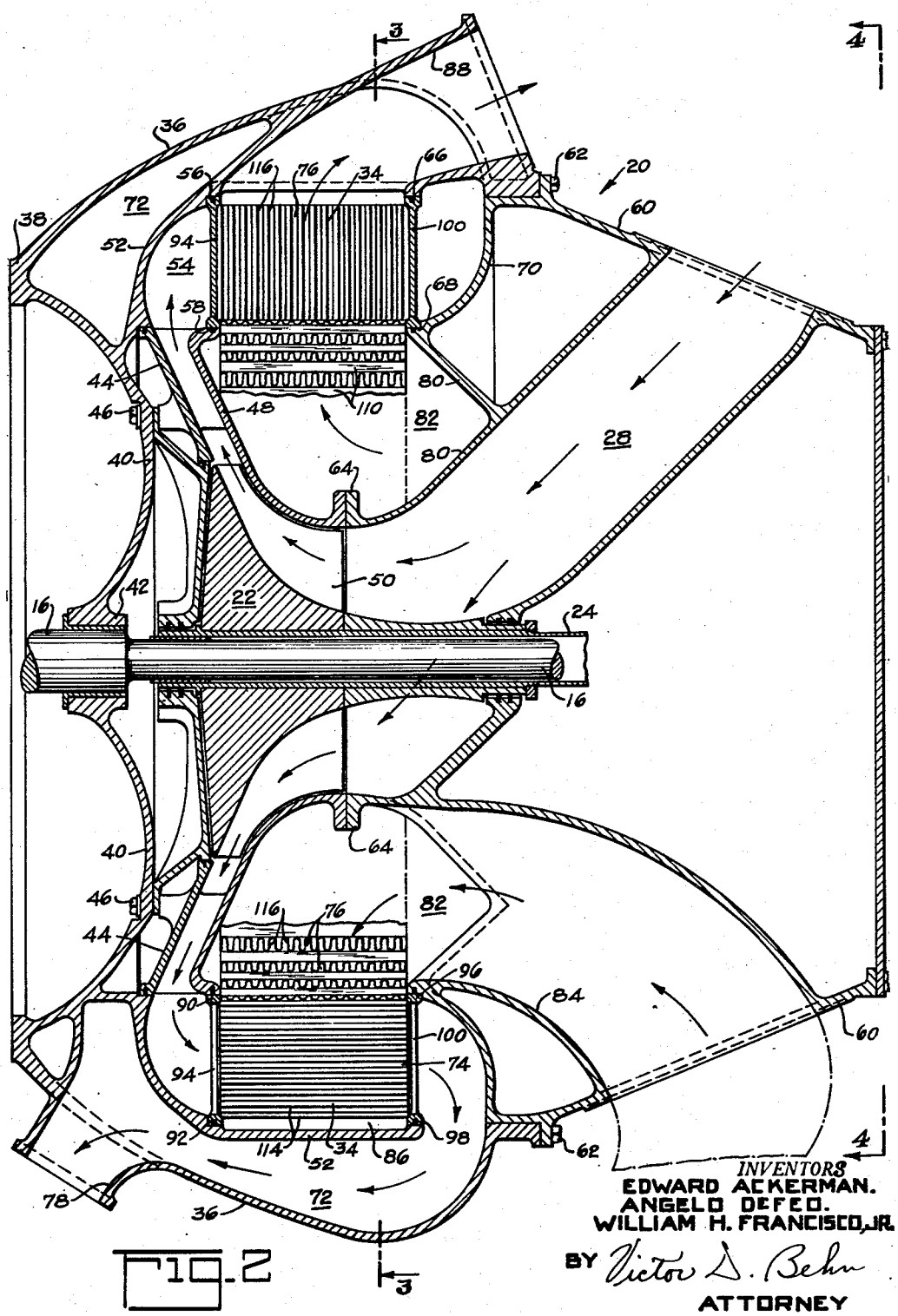
Fig. 2 is an enlarged sectional view of that portion of Fig. 1 embodying the novel features of the invention.

Referring first to Fig. 1 of the drawing, a radial cylinder internal combustion engine 10, of the type used for aircraft, is schematically illustrated in Fig. 1 as comprising a crankcase 12 having a plurality of radially disposed cylinders 14 mounted on and about the crankcase 12. A crankshaft 16 is journaled within the crankcase 12 for connection to pistons (not shown) slidable within the cylinders 14. One end of the crankshaft 16 is drivably connected to a propeller shaft 18. The crankcase has an extension or housing section 20 within which a supercharger 22 for the engine intake air is disposed. The engine crankshaft 16 extends into the crankcase extension or housing section 20 and is drivably connected to the supercharger drive shaft 24 by a speed step-up transmission schematically indicated at 26. The supercharger 22 has an air intake passage 28, said passage including a carburetor 30 or other air-fuel proportioning mechanism, which as illustrated, is mounted on the crankcase section 20. The air or combustion mixture compressed by the supercharger is delivered to a manifold from whence said air or mixture is distributed to the engine cylinders through intake pipes 32. The engine structure so described is conventional and, as will become apparent, the invention is not limited to this specific type of engine.

An annular heat exchange structure 34 utilizing air from the surrounding atmosphere for cooling the engine intake air is co-axially disposed within the crankcase or housing section 20. The supercharger 22 is illustrated as comprising a centrifugal type compressor and the heat exchange structure 34 is disposed about the impeller of said supercharger. The crankcase section 20, the supercharger 22 and heat exchange structure 34 are illustrated in more detail in Figs. 2–8.

Referring now to Figs. 2–8, the crankcase section 20 comprises a housing portion 36 having an annular flange 38 for securing said housing portion to the main crankcase section 12. The housing portion 36 has an annular diaphragm 40 providing a bearing 42 for the crankshaft 16. The supercharger 22 includes a fixed diffuser section 44 secured to the housing portion 36 by screws 46, said diffuser section including a wall 48 the inner end of which forms a shroud disposed across the tip or outer ends of the supercharger impeller blades 50.

The housing portion 36 also has an internal wall 52, a portion of which forms a wall of an annular manifold 54 into which the supercharger 22 delivers its compressed charge. As viewed in Fig. 2, the left end of the annular heat exchange structure 34 also forms a wall of said annular manifold 54. Said left end of the heat exchange structure 34 is located radially between radially inner and outer annular seats 56 and 58 formed respectively on the housing wall 52 and on the supercharger diffuser wall 48. The crankcase or housing 20 includes a portion 60 secured to the housing portion 36 as by screws 62 and abutting the supercharger wall 48 at 64. As viewed in Fig. 2, the right end of the annular heat exchange structure 34 is located radially by cylindrical seats 66 and 68 formed respectively on the wall 52 and on the housing portion 60. Suitable gaskets are provided at each of said seats 56, 58, 66 and 68 to prevent leakage thereacross.

The housing portion 60 includes a wall structure forming the duct 28 and through which the shafts 18 and 24 extend to form an annular entrance for the supercharger. The housing portion 60 also includes an annular wall 70 which together with the wall 52 and the outer wall of the housing portion 36 forms an annular manifold 72.

As hereinafter more specifically described, the heat exchange structure 34 includes a plurality of circumferentially-spaced axially-extending passages 74 and a plurality of circumferentially-spaced radially-extending passages 76. As viewed in Fig. 2, the left end of each axially extending passage 74 is in communication with the annular manifold 54 and the other end of each said passage is in communication with the annular manifold 72 whereby after compression by the supercharger 22 the engine intake air flows into the annular manifold 54 and thence through the heat exchange passages 74 into the annular manifold 72. The annular manifold 72 is provided with a plurality of outlets 78 to which intake pipes 32 are connected (see Fig. 1) whereby said pipes distribute the compressed charge from the manifold 72 to the engine cylinders.

The housing portion 60 also includes a wall structure 80 which together with the supercharger wall 48 forms an annular manifold 82 disposed radially inwardly of and communicating with the inner ends of the radially-extending heat exchange passages 76. In addition the housing portion 60 includes an internal wall structure providing a plurality of passages 84 for conducting cooling air from the surrounding atmosphere into the housing 20 to the annular manifold 82. As illustrated in Fig. 4, four such passages 84 are provided.

The space between the outer periphery of the heat exchange structure 34 and the wall 52 comprises an annular manifold 86 into which the cooling air discharges radially outwardly from the heat exchange passages 76. The housing portion 36 is provided with an internal wall structure forming a plurality of passages 88 extending across the manifold 72 and communicating with the manifold 86 for conducting the cooling air discharging from the heat exchange structure 34 to a point outside the housing 20. As illustrated in Figs. 3 and 4 six passages 88 are provided. In addition as illustrated in Fig. 3, the inlet end of each discharge passage 88 is flared to facilitate the discharge of air into said passages from the manifold 86.

The annular heat exchange structure 34 comprises a pair of similar co-axial axially-spaced end plates, the one comprising a pair of co-axial inner and outer rings 90 and 92 interconnected by a plurality of equally-spaced radially-disposed spoke-like arms 94 formed integral with said rings and the other end plate comprising a pair of co-axial inner and outer rings 96 and 98 interconnected by a plurality of equally-spaced radially-disposed spoke-like arms 100 formed integral with said latter rings. The spoke-like arms 94 and 100 are equal in number with each spoke-like arm 94 being disposed in axial alinement with a spoke-like arm 100 thereby forming a plurality of pairs of axially-alined spoke-like arms 94 and 100.

Except for its radially spaced ends, the space between each said pair of spoke-like arms 94 and 100 is enclosed by a pair of flat metallic plates 102 and 104 each plate extending from one side of one of said arms to the corresponding side of the other of said arms. In order to secure the plates 102 and 104 in position, a pair of channel-shaped members 106 and 108 are secured along the facing sides of each pair of arms 94 and 100, respectively, and each plate 102 and 104 is secured to the sides of said channel members. In addition, the radially spaced ends of the space between each plate 102 secured to one pair of arms 94 and 100 and the adjacent plate 104 secured to an adjacent pair of said arms is closed by channel-shaped members 110 and 112 secured along opposite radially-spaced ends of said plates. The channel members 110 extend axially along the inner periphery of the heat exchange structure 34 from the end ring 90 to the end ring 96 while the channel members 112 extend axially along the outer periphery of said structure from the end ring 92 to the end ring 98. Preferably, the various parts of the heat exchange structure are secured together by brazing.

With this heat exchange structure, each pair of plates 102 and 104 in combination with the associated pair of arms 94 and 100 form a passage 76 which extends radially through the heat exchange structure 34. Similarly each pair of channel members 110 and 112 with their associated plates 102 and 104 form a passage 74 which extends axially through the heat exchange structure 34. The passages 74 and 76 alternate around the entire heat exchange structure 34 and adjacent passages 74 and 76 are separated only by a plate 102 or 104, one surface of said plate forming a wall surface of one passage and the opposite surface of said plate forming a wall surface of the other of said passages. Accordingly the passages 74 and 76 with their separating plates 102 and 104 fill up the entire annular space occupied by the heat exchange structure 34 whereby said structure makes efficient use of said space notwithstanding its annular shape. This is quite important in the case of an aircraft engine because in such an engine the space available for such a heat exchange structure is quite limited.

The plates 102 and 104 are disposed so that the passages 76 are radial, each of said plates being disposed parallel to the axis of the heat exchange structure and each pair of said plates forming a passage 76 are disposed parallel to each other and to the radial direction of said passage. With this arrangement each passage 76 has a constant cross-sectional area, said area being rectangular. In addition each axially extending passage 74 has a constant cross-sectional area but the plates 102 and 104 bounding each passage 74 converge in a radially inward direction so that width of each passage 74 decreases in a radially inward direction. Because the cross-sectional area of each passage 74 and 76 is constant there is very little pressure drop through either of these passages.

In order to increase the heat transfer between the cooling air flowing through the passages 76 and the engine intake air flowing through the passages 74, each passage 74 is provided with a plurality of spaced heat-conducting sheet metal strips 114 extending in the direction of flow therethrough and extending across said passage from one of the plates 102 or 104 of said passage to the other of said plates. Each strip 114 and each strip 116 may be separately fabricated. As illustrated, however, the strips 114 of each passage 74 all form part of a corrugated sheet-metal member with the bends in said member contacting the associated plates 102 and 104. Similarly the strips 116 of each passage 76 preferably all form part of a corrugated sheet-metal member. The sheet metal strips 114 and 116 preferably are brazed to their associated plates 102 and 104 to assure good heat conducting contact therebetween.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a multi-cylinder internal combustion engine; a supercharger for the engine intake air; a housing for said supercharger; an annular heat exchange structure disposed within said housing co-axially about said supercharger, said heat exchange structure having alternate first and second circumferentially-spaced passages forming a complete annulus; a first annular manifold disposed within said housing and communicating with the discharge end of said supercharger and with one end of said first passages whereby after compression by said supercharger the engine intake air flows into said first manifold and thence through said first passages; a second annular manifold disposed within said housing and communicating with one end of said second passages; and passage means for supplying cooling air from a point outside said housing to said second manifold for flow through said second passages for cooling said engine intake air.

2. In a multi-cylinder internal combustion engine; a supercharger for the engine intake air; a housing for said supercharger; an annular heat exchange structure disposed within said housing co-axially about said supercharger, said heat exchange structure having alternate axially and radially extending passages therethrough; a first annular manifold disposed within said housing and communicating with the discharge end of said supercharger and with one end of said axially-extending heat exchange passages whereby after compression by said supercharger the engine intake air flows into said first manifold and thence through said axially-extending heat exchange passages; a second annular manifold disposed within said housing between said heat exchange structure and at least a portion of said supercharger and communicating with the radially inner ends of said radially-extending heat exchange passages; and passage means for supplying cooling air from a point outside said housing to said second manifold for flow radially outwardly through said radially-extending passages for cooling said engine intake air, said annular manifolds being co-axial with said supercharger and heat exchange structure.

3. In a multi-cylinder internal combustion engine; a supercharger for the engine intake air; a housing for said supercharger; an annular heat exchange structure disposed within said housing co-axially about said supercharger, said annular heat exchange structure having circumferentially-spaced axially-extending passages therethrough and having circumferentially-spaced radially-extending passages therethrough alternating with said axially-extending passages, each of said axially-extending passages having circumferentially-spaced side walls converging in a radially inward direction and each of said radially-extending passages having circumferentially-spaced parallel side walls; a first annular manifold disposed within said housing and communicating with the discharge end of said supercharger and with one end of said axially-extending heat exchange passages whereby after compression by said supercharger the engine intake air flows into said first manifold and thence through said axially-extending heat exchange passages; a second annular manifold disposed within said housing between said heat exchange structure and at least a portion of said supercharger and communicating with the radially inner ends of said radially-extending heat exchange passages; and passage means for supplying cooling air from a point outside said housing to said second manifold for flow radially outwardly through said radially-extending passages for cooling said engine intake air, said annular manifolds being co-axial with said supercharger and heat exchange structure.

4. In a multi-cylinder internal combustion engine; a supercharger for the engine intake air; a housing for said supercharger; an annular heat exchange structure disposed within said housing co-axially about said supercharger, said annular heat exchange structure having circumferentially-spaced axially-extending passages therethrough and having circumferentially-spaced radially extending passages therethrough alternating with said axially-extending passages, said passages being separated by common wall so that said passages with said walls form a complete annulus; a first annular manifold disposed within said housing and communicating with the discharge end of said super-charger and with one end of said axially-extending heat exchange passages whereby after compression by said supercharger the engine intake air flows into said first manifold and thence through said axially-extending heat exchange passages; a second annular manifold disposed within said housing between said heat exchange structure and at least a portion of said supercharger and communicating with the radially inner ends of said radially-extending heat exchange passages; and passage means for supplying cooling air from a point outside said housing to said second manifold for flow radially outwardly through said radially-extending passages for cooling said engine intake air, said annular manifolds being co-axial with said supercharger and heat exchange structure.

5. In a multi-cylinder internal combustion engine having a crankshaft, a supercharger drivably connected to said crankshaft and a housing within which said crankshaft and supercharger are disposed and on which said cylinders are mounted: the combination therewith of an annular heat exchange structure having first and second passages; a first annular manifold disposed within said housing and communicating with the discharge end of said supercharger and with one end of said first heat exchange passages; a second annular manifold disposed within said housing and communicating with the other end of said first passages whereby after compression by said supercharger the engine intake air flows into said first manifold and thence through said first passages to said second manifold; passage means for distributing said engine intake air from said second manifold to the engine cylinders; a third annular manifold disposed within said housing and communicating with one end of said second heat exchange passages; and passage means for supplying cooling air from a point outside said housing to said third manifold for flow through said second passages for cooling said engine intake air.

6. In a multi-cylinder internal combustion engine having a crankshaft, a supercharger drivably connected to said crankshaft and a housing within which said crankshaft and supercharger are disposed and on which said cylinders are mounted: the combination therewith of an annular heat exchange structure disposed within said housing co-axially about said supercharger, said heat exchange structure having axially-extending passages therethrough and having radially-extending passages therethrough; a first annular manifold disposed within said housing and communicating with the discharge end of said supercharger and with one end of said axially-extending heat exchange passages; a second annular manifold disposed within said housing and communicating with the other end of said axially-extending passages whereby after compression by said supercharger the engine intake air flows into said first manifold and thence through said axially-extending heat exchange passages to said second manifold; passage means communicating with said second manifold for distributing said engine intake air from said second manifold to the engine cylinders; a third annular manifold disposed within said housing and communicating with the radially inner ends of said radially-extending heat exchange passages; and passage means for supplying cooling air from a point outside said housing to said third manifold for flow radially outwardly through said radially-extending passages for cooling said engine intake air, said annular manifolds being co-axial with said supercharger and heat exchange structure.

7. In a multi-cylinder internal combustion engine having a crankshaft, a supercharger drivably connected to said crankshaft and a housing within which said crankshaft and supercharger are disposed and on which said cylinders are mounted: the combination therewith of an annular heat exchange structure disposed within said housing co-axially about said supercharger, said heat exchange structure having axially-extending passages therethrough and having radially-extending passages therethrough; a first annular manifold disposed within said housing and communicating with the discharge end of said supercharger and with one end of said axially-extending heat exchange passages; a second annular manifold disposed within said housing and communicating with the other end of said axially-extending passages whereby after compression by said supercharger the engine intake air flows into said first manifold and thence through said axially-extending heat exchange passages to said second manifold; passage means communicating with said second manifold for distributing said engine intake air from said second manifold to the engine cylinders; a third annular manifold disposed within said housing between said heat exchange structure and at least a portion of said supercharger and communicating with the radially inner ends of said radially-extending heat exchange passages; passage means for supplying cooling air from a point outside said housing to said third manifold for flow radially outwardly through said radially extending passages for cooling said engine intake air; and passage means extending across said second annular manifold and communicating with the radially outer ends of said radially-extending passages for discharging said cooling air to a point outside said housing.

8. In a multi-cylinder internal combustion engine; a crankcase; a plurality of engine cylinders mounted on said crankcase; a supercharger for the engine intake air; a housing forming an extension of said crankcase and within which said supercharger is disposed; a plurality of intake pipes disposed outside of said supercharger housing and extending from the supercharger housing to said engine cylinders; a heat exchange structure disposed within said housing and having first and second sets of passages disposed in heat exchange relation with each other, the opposite ends of the passages of said first set communicating with the discharge end of said supercharger and with said intake pipes for conveying engine intake air from said supercharger to said intake pipes; and passage means for supplying cooling air from outside said housing to the passages of said second set for flow of said cooling air therethrough for cooling said engine intake air.

9. In a multi-cylinder internal combustion engine; a crankcase; a plurality of engine cylinders mounted on said crankcase; a supercharger for the engine intake air; a housing forming an extension of said crankcase and within which said supercharger is disposed; a plurality of intake pipes disposed outside of said supercharger housing and extending from the supercharger housing to said engine cylinders; a heat exchange structure disposed within said supercharger housing adjacent to the supercharger outlet and symmetrically disposed about the supercharger axis, said heat exchange structure having first and second sets of passages disposed in heat exchange relation with each other, the opposite ends of the passages of said first set communicating with the discharge end of the supercharger and with said intake pipes for conveying engine intake air from said supercharger to said intake pipes; and passage means for supplying cooling air from a point outside said housing to the passages of said second set for flow of said cooling air therethrough for cooling said engine intake air.

10. In a multi-cylinder internal combustion engine; a crankcase; a plurality of engine cylinders mounted on the crankcase; a supercharger for the engine intake air; a housing forming an extension of said crankcase and within which said supercharger is disposed; a plurality of intake pipes disposed outside of said supercharger housing and extending from the supercharger housing to said engine cylinders; a heat exchange structure disposed within said supercharger housing adjacent to the supercharger outlet and symmetrically disposed about the supercharger axis, said heat exchange structure having first and second sets of passages disposed in heat exchange relation with each other, the opposite ends of the passages of said first set communicating with the discharge end of the supercharger and with said intake pipes for conveying engine intake air from said supercharger to said intake pipes; an annular manifold disposed within said housing and communicating with one end of said second passages; and passage means for supplying cooling air from outside said housing to said manifold for flow of said cooling air through said second passages for cooling said engine intake air.

EDWARD ACKERMAN.
ANGELO DE FEO.
WILLIAM H. FRANCISCO, Jr.

References Cited in the file of this patent

UNITED STATES PATENTS

| Number | Name | Date |
| --- | --- | --- |
| 1,935,186 | King | Nov. 14, 1933 |
| 2,137,399 | Higbie et al. | Nov. 22, 1938 |
| 2,241,420 | Pinkel | May 13, 1941 |
| 2,350,784 | Loehner et al. | June 6, 1944 |
| 2,367,223 | Larrecq | Jan. 16, 1945 |
| 2,423,175 | Churchill et al. | July 1, 1947 |